US010571793B2

(12) United States Patent
Rebot

(10) Patent No.: US 10,571,793 B2
(45) Date of Patent: Feb. 25, 2020

(54) IMAGE PROJECTION DEVICE

(71) Applicant: Natalie Rosanna Rebot, Toronto (CA)

(72) Inventor: Natalie Rosanna Rebot, Toronto (CA)

(73) Assignee: MOONLITE WORLD INC., Toronto, Ontario (CA)

( * ) Notice: Subject to any disclaimer, the term of this patent is extended or adjusted under 35 U.S.C. 154(b) by 353 days.

(21) Appl. No.: 15/217,067

(22) Filed: Jul. 22, 2016

(65) Prior Publication Data

US 2017/0363947 A1    Dec. 21, 2017

Related U.S. Application Data

(60) Provisional application No. 62/351,506, filed on Jun. 17, 2016.

(51) Int. Cl.
| | |
|---|---|
| G03B 21/64 | (2006.01) |
| G03B 21/53 | (2006.01) |
| G03B 21/00 | (2006.01) |
| G03B 21/20 | (2006.01) |
| G02B 13/00 | (2006.01) |
| G02B 13/16 | (2006.01) |

(Continued)

(52) U.S. Cl.
CPC .......... *G03B 21/64* (2013.01); *G02B 13/001* (2013.01); *G02B 13/16* (2013.01); *G03B 3/10* (2013.01); *G03B 15/05* (2013.01); *G03B 21/001* (2013.01); *G03B 21/20* (2013.01); *G03B 21/53* (2013.01); *G03B 21/54* (2013.01); *G03B 23/08* (2013.01); *G03B 29/00* (2013.01); *G06K 7/10861* (2013.01); *G06K 19/0614* (2013.01); *G06K 19/06028* (2013.01); *G06K 19/06037* (2013.01); *H04N 5/2252* (2013.01); *H04N 5/2257* (2013.01)

(58) Field of Classification Search
CPC ........ G03B 21/64; G03B 21/53; G03B 21/54; G02B 3/10; G02B 15/05
USPC .......................................................... 353/68
See application file for complete search history.

(56) References Cited

U.S. PATENT DOCUMENTS

| | | |
|---|---|---|
| 2,445,651 A | 7/1948 | Weavie |
| 2,478,336 A | 8/1949 | Begun |

(Continued)

FOREIGN PATENT DOCUMENTS

| | | |
|---|---|---|
| CN | 104950558 A | 9/2015 |
| CN | 205958898 U | 2/2017 |

(Continued)

OTHER PUBLICATIONS

Machine Translation of JP 2004326064 A.*

(Continued)

*Primary Examiner* — Jerry L Brooks
(74) *Attorney, Agent, or Firm* — Millman IP Inc.

(57) ABSTRACT

An image projection device is disclosed having a body defining an aperture that includes a slide frame receiving slot that is transverse to the aperture and a magnifying lens positioned in alignment with the aperture at the front of the body. The image projection device can be attached to a mobile device and uses the camera flash of the mobile device to provide the light source to illuminate a slide transparency. The mobile device can identify a particular slide transparency through information encoded on the slide frame in order to coordinate audio or video output with the projected slide.

5 Claims, 7 Drawing Sheets

(51) Int. Cl.
| | |
|---|---|
| *G03B 15/05* | (2006.01) |
| *G06K 7/10* | (2006.01) |
| *G06K 19/06* | (2006.01) |
| *H04N 5/225* | (2006.01) |
| *G03B 3/10* | (2006.01) |
| *G03B 21/54* | (2006.01) |
| *G03B 23/08* | (2006.01) |
| *G03B 29/00* | (2006.01) |

(56) References Cited

U.S. PATENT DOCUMENTS

| | | | |
|---|---|---|---|
| 3,741,637 A | 6/1973 | Katsuragi | |
| 4,627,696 A * | 12/1986 | Sacher | G03B 23/18 353/110 |
| 5,321,449 A | 6/1994 | Coccoli | |
| 7,874,683 B2 | 1/2011 | Noba | |
| 8,721,160 B2 | 5/2014 | Chien | |
| 8,744,521 B2 | 6/2014 | Kim | |
| 8,973,844 B2 | 3/2015 | Mesh-Iliescu | |
| 2001/0050755 A1 * | 12/2001 | Bogomolnyi | G03B 31/00 353/15 |
| 2003/0024975 A1 | 2/2003 | Rajasekharan | |
| 2005/0072691 A1 | 4/2005 | Schlansky | |
| 2007/0171383 A1 * | 7/2007 | Deves | G03B 21/54 353/79 |
| 2009/0108057 A1 | 4/2009 | Mu | |
| 2009/0237812 A1 | 9/2009 | Tseng | |
| 2011/0320208 A1 | 12/2011 | Wong | |
| 2012/0017236 A1 | 1/2012 | Stafford | |
| 2012/0245422 A1 | 9/2012 | Hasbun | |
| 2013/0267283 A1 | 10/2013 | Guzman | |
| 2013/0276012 A1 | 10/2013 | Ingram | |
| 2013/0331148 A1 | 12/2013 | Brough | |
| 2014/0281855 A1 | 9/2014 | Bhatnagar | |
| 2015/0077518 A1 | 3/2015 | Heine | |
| 2015/0172431 A1 | 6/2015 | Huang | |
| 2015/0323160 A1 | 11/2015 | Duguid | |
| 2016/0360871 A1 | 12/2016 | Schessel | |
| 2017/0064168 A1 | 3/2017 | Roman | |
| 2017/0119250 A1 | 5/2017 | Kolachalama | |
| 2017/0237843 A1 | 8/2017 | Ackeret | |
| 2017/0345536 A1 | 11/2017 | Breiwa | |

FOREIGN PATENT DOCUMENTS

| | | | |
|---|---|---|---|
| EP | 0246799 B1 | 5/1991 | |
| ES | 1079196 U | 5/2013 | |
| JP | 56-168859 U1 | 5/1983 | |
| JP | 2004326064 A * | 10/2004 | G03B 21/08 |
| JP | 2006025983 A | 2/2006 | |
| KR | 10-2010-0138863 A | 12/2010 | |
| KR | 10-2015-0015664 | 2/2015 | |
| WO | WO2007011123 A1 | 1/2007 | |
| WO | 2014/091042 A1 | 6/2014 | |
| WO | WO2015092785 A1 | 6/2015 | |
| WO | 2017/132678 A1 | 8/2017 | |

OTHER PUBLICATIONS

KR 10-2018-7003909, Office Action dated Jun. 20, 2018, Korean Intellectual Property Office.
U.S. Appl. No. 15/881,018, Non-Final Office Action, dated Jun. 26, 2018, US Patent and Trademark Office.
U.S. Appl. No. 15/886,679, Non-Final Office Action, dated Mar. 21, 2018, US Patent and Trademark Office.
PCT/CA2017/000152, International Search Report, dated Sep. 28, 2017, Canadian Intellectual Property Office.
EP 17812342.8, Supplementary European Search Report, European Patent Office, dated Oct. 2, 2018.
CA 3005079, Office Action, Canadian Intellectual Property Office, dated Dec. 13, 2018.
EP 17812342.8, Partial Supplementary European Search Report, European Patent Office, dated Jun. 29, 2018.
JP 2018-503623, Office action & English translation, Japanese Patent Office, dated Jul. 10, 2018.
EP 18183375.7, Partial European Search Report, European Patent Office, dated Feb. 13, 2019.
AU 2018204785, First Examination Report, IP Australia, Australian Government, dated Mar. 12, 2019.
EP 18183375.7, Extended European Search Report & Written Opinion, European Patent Office, dated May 21, 2019.

* cited by examiner

IMAGE PROJECTION DEVICE

FIELD

The present disclosure relates generally to an image projection device. More particularly, the disclosure relates to an image projection device that uses a light source external to the device for illumination.

BACKGROUND

Image projection devices that utilize a light bulb to illuminate a slide transparency or film in combination with a lens to enlarge the image onto a viewing surface are well known. Slide projectors for viewing 35 mm slides came into widespread use during the 1950s for home entertainment and educational uses. These slide projectors included an electric incandescent light bulb or other light source, a condensing lens or reflector to direct light onto the slide, a slide holder, and a focusing lens. Slide projectors have fallen out of use in favor of more convenient digital media shown on a projection screen using a video projector or displayed on a large video monitor.

Flashlight projectors are a novelty or toy item that use a flashlight as the light source to illuminate a slide transparency. These devices typically include a mechanism to attach to the flashlight, a mechanism to mount the slide in position, and optics to focus and enlarge the slide image. Examples include U.S. Pat. Nos. 2,445,651, 2,478,336, and 5,321,449.

Mobile devices, such as smart phones, digital cameras and tablet computing devices, can also be equipped with an image projector. This type of technology typically uses a liquid crystal on silicon display with an LED to illuminate the display. Adding an image projector to a mobile device can significantly increase the costs of producing the mobile device.

SUMMARY

According to a first aspect, an image projection device is provided that can be used in association with a mobile device having a camera flash. The image projection device comprises a body defining an aperture, the body having an attachment mechanism to attach to the mobile device and align the aperture with camera flash; a slide frame receiving slot within the body, the slide frame receiving slot is transverse to the aperture; and a magnifying lens aligned with the aperture, the magnifying lens positioned at a front end of the body. A slide transparency contained in a slide frame can be positioned with the slide frame receiving slot and the camera flash illuminates the slide transparency and the magnifying lens enlarges the illuminated slide transparency to project upon a projection surface. The image projection device can also include a focus adjustment mechanism containing the magnifying lens to allow for translation of the magnifying lens axially with respect to the aperture. The focus adjustment mechanism can include a telescoping mechanism or a screw-type mechanism.

The image projection device can further include a motor and can be electrically coupled to the mobile device to obtain instructions. The motor can be coupled to the focus adjustment mechanism to allow the mobile device to provide instructions to the motor to adjust focus based on a projected image detected by the camera. Alternatively, or using an additional motor, a motor can be coupled to the slide frame using a gearing mechanism to advance the slide frame upon instructions from the mobile device.

The image projection device can be attached to the mobile device using a removable adhesive, such as a nano-suction material, for example. The attachment mechanism can also be a clamp or a mobile device case, such as a protective mobile phone case.

The slide frame receiving slot of the image projection device can be configured to accept any shape of slide frame, including rectangular and circular-shaped slide frames. The slide frame receiving slot can have a flexible detent for interacting with a notch or depression on the external surface of the slide frame to aid alignment of the slide frame with the aperture.

The image projection device can also include a camera opening that is aligned with a camera of the mobile device to allow the camera of the mobile device to capture an encoding block on the slide frame. The body can also include a light channel that is coupled to the aperture to allow light from the camera flash to enter the camera opening.

According to another aspect, a slide frame is provided that comprises one or more slide transparencies and encoded information associated with a corresponding slide transparency. The encoded information can be in an encoding block adjacent to the slide transparency. The encoding block can encode information using a barcode, a color, and a near-field wireless communication tag. The encoded information can also be encoded in the image of the slide transparency, such as by embedding a barcode into the slide image.

According to a third aspect, a method of operating image projection device and mobile device is provided. The method includes identifying a change in the encoding information detected by the slide decoder; associating the change in the encoding information with an event; and triggering the event. The event can be any one or more of change the video display of the mobile device, audio playback from a speaker of the mobile device, operating the camera flash. The slide decoder can be a camera of the mobile device or a near-field communication sensor, for example.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather serves as merely describing some of the possible methods of implementation.

Figure 1:
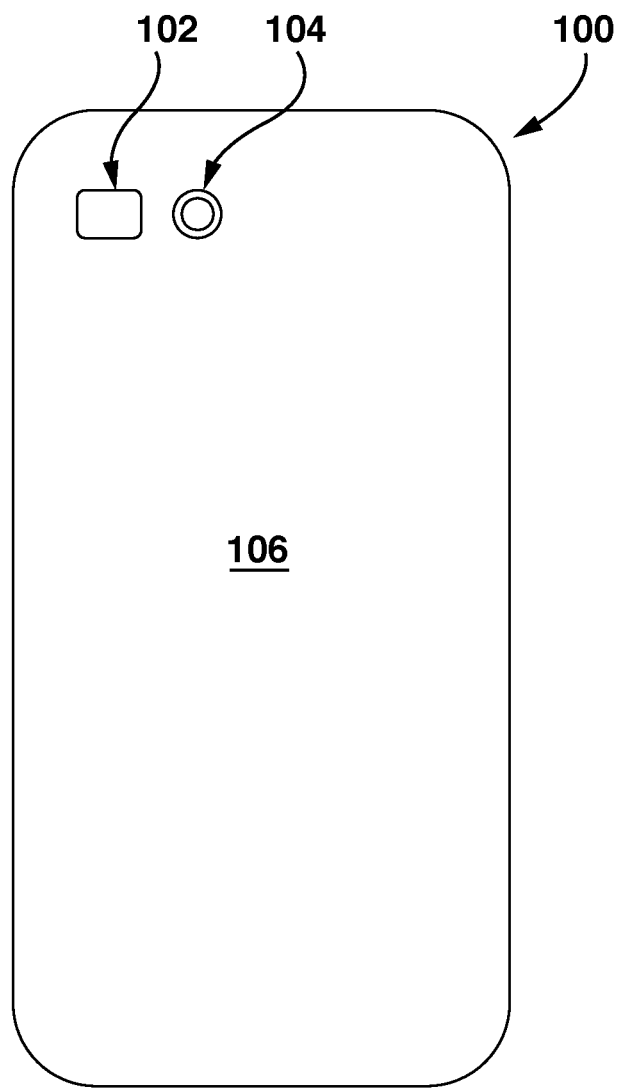
FIG. 1 is a rear view of a mobile device illustrating a camera aperture and camera flash.

Referring now to FIG. 1, shown is a rear view of a typical mobile device 100 illustrating a camera flash 102 and a camera aperture 104 that can be used with embodiments of the image projection device described herein. Typically, mobile device 100 includes a video display on the front surface of mobile device 100 (not shown) opposite the rear surface 106. Some embodiments of the image projection device could also be configured to work with a camera flash on the front facing surface of mobile device 100. Mobile device 100 can include any handheld computing device that includes a camera flash 102, and can include smart phones, tablet computers, digital cameras, and potentially laptops.

Camera flash 102 is typically a light emitting diode flash, and can be controlled by mobile device 100 through a combination of software and hardware. Camera aperture 104 typically includes optics and a CMOS-based image sensor to capture digital images. The camera can similarly be controlled through a combination of software and hardware operating on mobile device 100.

Embodiments of the image projection device can be configured to work with any mobile device 100 that uses a camera flash 102. The orientation of camera flash 102 and camera aperture 104 can vary based on the manufacturer of the mobile device. For example, some mobile devices orient the camera flash 102 and camera aperture 104 on the middle of the rear surface in a vertical or top-bottom orientation. Some embodiments of the image projection device described herein can be designed to attach to a specific device based on the dimensions of the mobile device and orientation of the sensors. Other embodiments can use other attachment mechanisms that do not rely on particular dimensions of mobile device 100 or the orientation of camera flash 102 and camera aperture 104.

Figure 2:
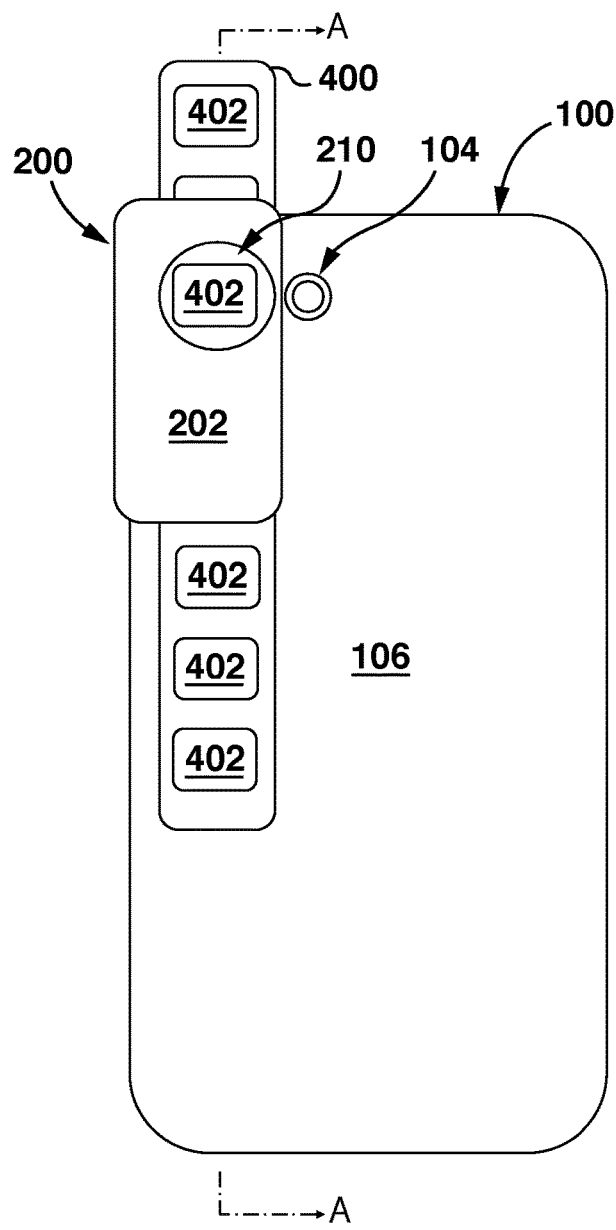
FIG. 2 is a rear view of an image projection device attached to the mobile device of FIG. 1.
Figure 2A:
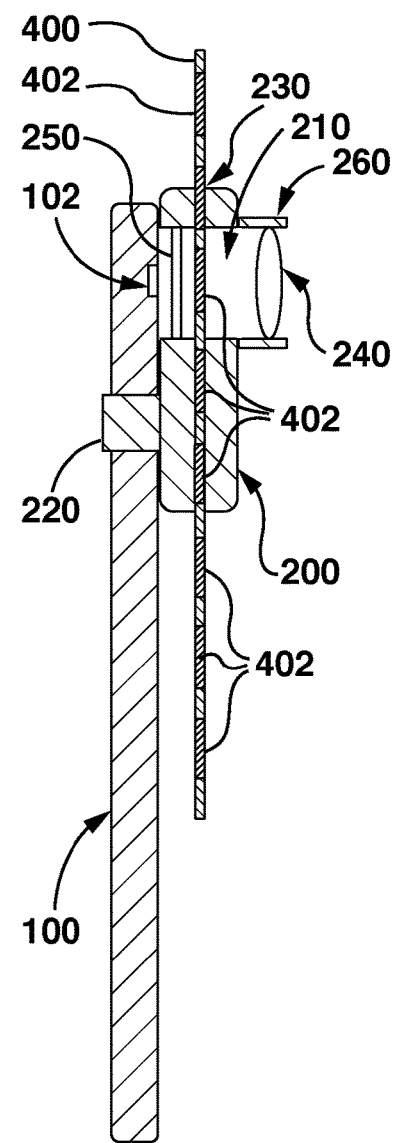
FIG. 2A is a cross-sectional view of the image projection device of FIG. 2 along line A-A.

Referring now to FIGS. 2 and 2A, shown is an image projection device 200 attached to the mobile device 100 of FIG. 1 with FIG. 2A providing a cross-sectional view of image projection device 200 along line A-A. Body 202 of image projection device 200 attaches to mobile device 100 and has an aperture 210 that is aligned with camera flash 102. A slide transparency 402 is aligned with aperture 210 and is illuminated by camera flash 102. Magnifying lens 240 enlarges illuminated slide transparency 402 onto a projection surface, such as a wall, ceiling, or projection screen.

Body 202 of image projection device 200 preferably includes an attachment mechanism 220 to attach body 202 to mobile device 100. Attachment mechanism 220 can include a mechanical clamp, as shown in FIG. 2A, that can be made of a resilient material to accommodate the thickness of mobile device 100. In some embodiments, projection device 200 can be embodied in a traditional protective mobile phone case that serves as the attachment mechanism, such as those cases that surround the edge and/or rear surface of the mobile phone.

Preferably, attachment mechanism 220 comprises a removable adhesive that is attached to body 202 to allow placement and removal of image projection device 200 on rear surface 106 of mobile device 100. Removable adhesive can include nano-suction material that is attached to the mating surface of body 202. The surface of nano-suction material has thousands of microscopic craters that work by creating many partial vacuums between the adhesive and the rear surface 106 of mobile device 100. Nano-suction material is not pressure sensitive, can rebond repeatedly, and leaves no residue on the mobile device. To remove image projection device 200 from mobile device 100, you simply pull off or twist to break the bond. Wiping nano-suction adhesive material with wet tissue will remove debris from the craters and rejuvenate the suction properties.

Body 202 further provides a slide frame receiving slot 230 that is shaped to receive a slide frame (such as those shown in FIGS. 4-6) that contains any number of slide transparencies. The slide frame can be round, rectangular or any other shape, and slide frame receiving slot 230 will have a corresponding shape to accommodate the slide frame. Slide frame receiving slot 230 is transverse to aperture 210 in order to position slide frame transparencies within aperture 210. The slide frame is positioned with slide frame receiving slot 230 to align one of slide transparencies with camera flash 102 and aperture 210. Camera flash 102, under control of mobile device 100, illuminates the slide transparency 402 within aperture 210. Slide frame receiving slot 230 can be formed within body 202, as shown in FIG. 2A, or in a channel on the rear-facing surface of body 202. The position of slide frame receiving slot 230 with respect to body 202, camera flash 102, and magnifying lens 240 can be selected to optimize image projection quality.

Magnifying lens 240 is aligned with aperture 210 and positioned at the front of body 202 of image projection device 200. Magnifying lens 240 is positioned between the illuminated a slide transparency and the projection surface. Magnifying lens 240 enlarges the slide transparency that is illuminated by camera flash 102 for projection onto a projection surface, such a wall or ceiling, for example. Although a simple biconvex lens is shown for illustration purposes, a person skilled in the art would provide the appropriate lens design to provide magnification and projection of a slide transparency. This can include compound lens designs involving more than one lens.

Some embodiments of image projection device 200 can further include a focus adjustment mechanism 260 that houses magnifying lens 240. Focus adjustment mechanism 260 can allow translation of magnifying lens 240 axially with respect to aperture 210 to change the distance between an illuminated slide transparency 402 and magnifying lens 240 in order to alter the magnification or focus of the projected image. Focus adjustment mechanism 260 can include a telescoping arrangement or a screw-type arrangement that allows for movement of magnifying lens 240. In a compound lens design, only one of the lens may be moveable by focus adjustment mechanism.

Some embodiments of image projection device 200 can also include a flash conditioner 250 that is positioned within aperture 210 between camera flash 102 and a slide transparency. Flash conditioner 250 can assist with providing proper and full illumination of slide transparency 402. Flash conditioner 250 can include, for example, a light diffusing material or a collimation lens (e.g. a plano-convex lens). For example, a plano-convex lens can be used so that incoming LED light beams from camera flash 102 are formed into parallel light beams as they hit the slide transparency so the projected image can have improved clarity.

Aperture 210 can have a variety of shapes. Aperture 210 can be round to accommodate a round magnifying lens 240, for example. Aperture 210 can also be shaped similar to the shape of the slide transparencies on the slide frame, which can be round, rectangular, or any other shape, so that slide transparency 402 completely fills aperture 210. Aperture 210 can also be conically shaped, or similarly have an increasing size, from the rear surface of body 202 adjacent to camera flash 102 to the front surface of body 202.

Some embodiments of image projection device 200 can also be electrically powered to provide further functionality. Electrical power can be obtained through coupling with mobile device 100, such as through a USB charging port or a Lightning connector for devices produced by Apple, for example. Other embodiments of image projection device 200 can further comprise a battery to provide electrical power. In some embodiments, body 202 can include a battery that provides supplemental power to mobile device 100 through the charging port. For example, image projection device 200 can be embodied in a mobile phone case that includes a supplemental battery similar to those produced by mophie inc. A supplemental battery can also be beneficial to assist with the increased power demand from the sustained use of camera flash 102.

Image projection device 200 can also be coupled with mobile device 100 by a communication interface. For example, mobile device 100 can provide instructions regarding slide advancement or focus adjustment. This can be over the same interface as the power supply (e.g. micro USB or Lightning), or another interface if image projection device 200 is self-powered (e.g. headphone/microphone jack of mobile device 100, wireless communication, such as Bluetooth or NFC).

In some embodiments, image projection device 200 can include a slide decoder that can be used to identify the slide frame, and may further identify a particular slide transparency within aperture 210. The slide decoder can include electronics requiring power. A slide decoder can include a near-field wireless communication (NFC) transceiver that can read one or more wireless tags embedded in a slide frame, for example. The decoded information that identifies the slide transparency 4 and/or slide frame 4 can be communicated to mobile device 100 over the communication interface. Other methods of encoding information onto a slide frame and slide transparencies, and the respective method decoding with a slide decoder embodiment, are discussed with respect to FIGS. 4-6.

In other embodiments of image projection device 200, a slide decoder can be provided by mobile device 100, either alone or in conjunction with slide decoding functionality provided by image projection device. For example, an NFC transceiver of mobile device 100 can identify a particular slide frame and a slide decoder on image projection device 200 can identify a particular slide transparency. FIGS. 3-6 provide examples where camera of mobile device 100 can serve as the slide decoder.

Electrically powered embodiments of image projection device 200 can include a slide advancement motor that is coupled to the slide frame (e.g. using a gearing arrangement). Slide advancement motor can move the slide frame within the slide frame receiving slot 230 to position the next slide transparency. Image projection device 200 can include buttons to control the slide advancement motor, such as forwards and backwards buttons. In other embodiments, mobile device 100 can provide instructions to slide advancement motor to control which slide transparency is within aperture 210.

Electrically powered embodiments of image projection device 200 can also include a focus adjustment motor that can be coupled to focus adjustment mechanism 260 to adjust position of magnifying lens 240. Again, this can be controlled by buttons on image projection device 200 or by mobile device 100. Camera of mobile device 100 can capture the projected image and mobile device 100 can determine whether the captured image is in focus, for example, by using an edge detection algorithm. Mobile device 100 can provide instructions to the focus adjustment motor based on this information. Mobile device 100 can periodically monitor the projected image using the camera to maintain focus of the projected image. Mobile device 100 can also rely on information from onboard motion sensors/accelerometers to consider whether to reevaluate focus adjustment with the focus adjustment motor.

Figure 3A:
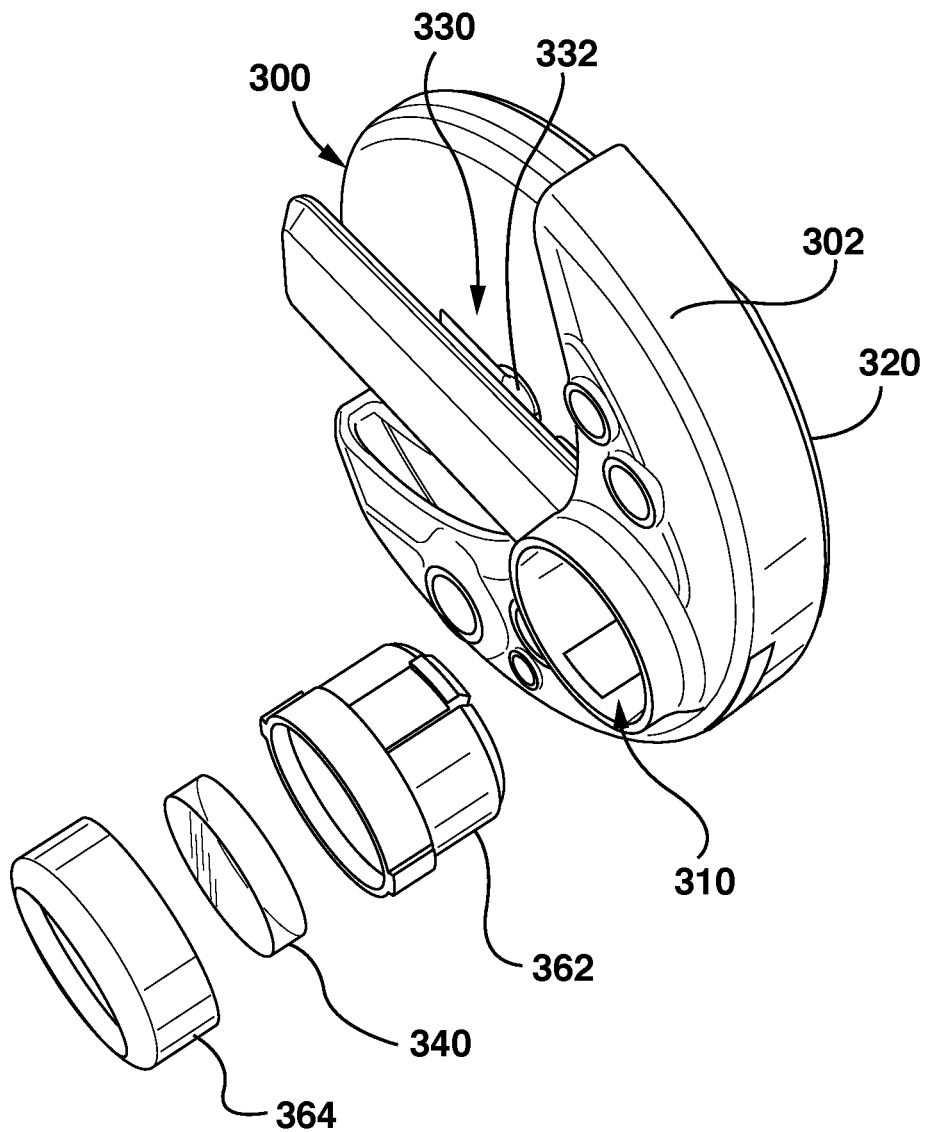
FIG. 3A is front perspective exploded view of an embodiment of an image projection device.
Figure 3B:
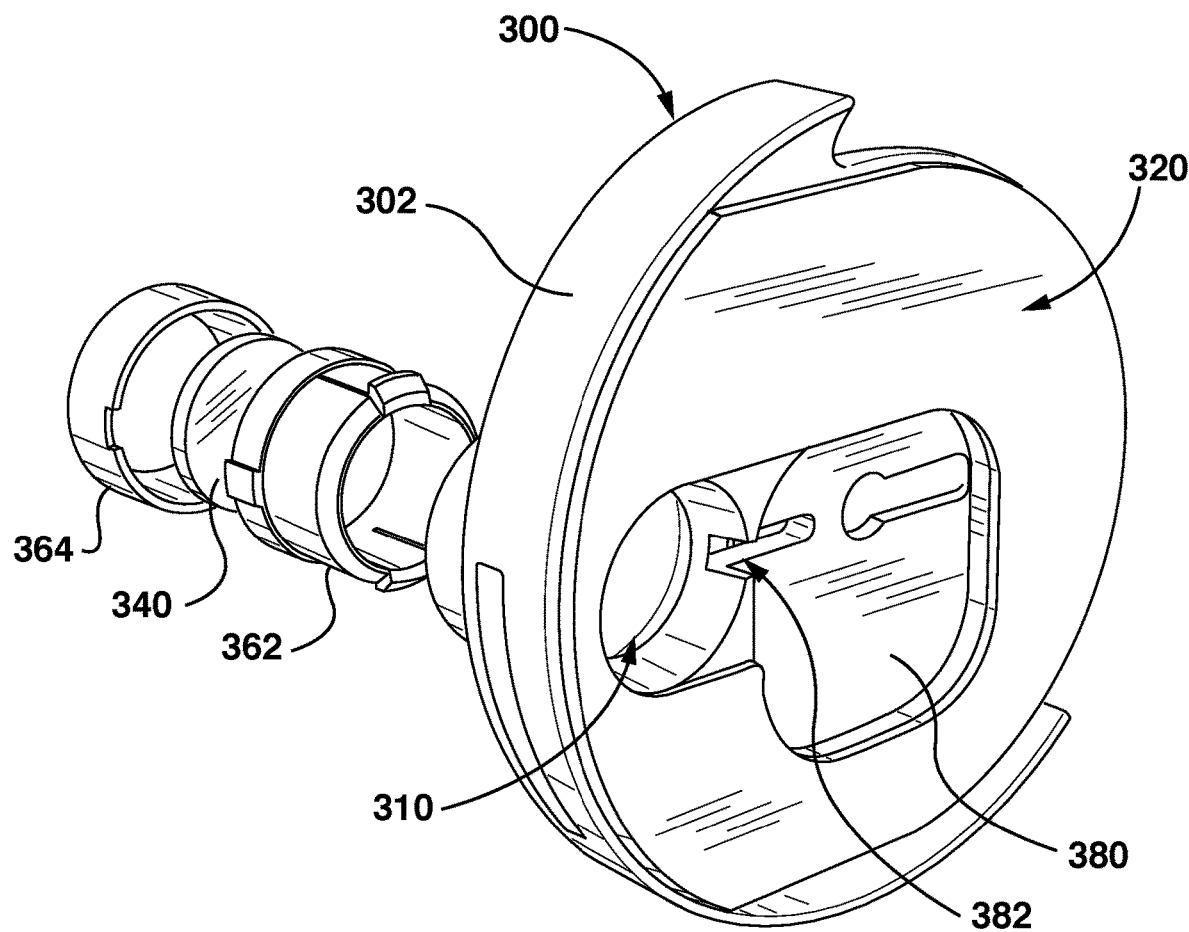
FIG. 3B is a rear perspective exploded view of the image projection device of FIG. 3A.
Figure 4:
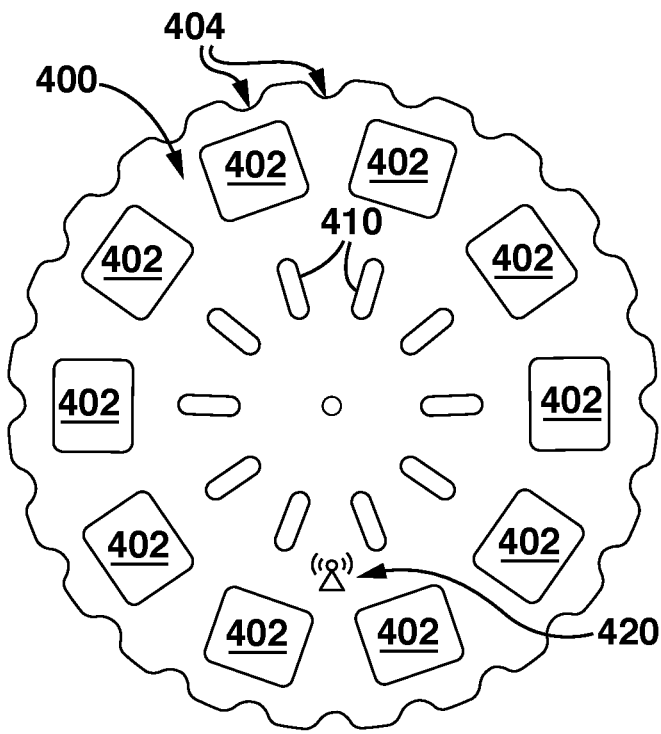
FIG. 4 is a front view of a circular-shaped slide frame including slide encoding information in an adjacent encoding block.

Referring now to FIGS. 3A and 3B, shown is are front and rear exploded perspective views of an image projection device 300 for accepting circular-shaped slide frames, such as that shown in FIG. 4. Body 302 of image projection device 300 defines an aperture 310 that intersects with a slide frame receiving slot 330. Attachment mechanism 320 is a nano-suction material that is attached to the rear surface of body 302 of image projection device 300.

Slide frame receiving slot 330 contains a slide frame alignment mechanism 332 for engaging with the center of a rotary slide frame 400. The center of a circular slide frame 400 can have a hole, depression, protrusion, axle that mates with slide frame alignment mechanism 332 to position circular slide frame 400 in position and allow for rotation. FIG. 3A illustrates a flexible protrusion 332 that can engage a hole or depression at the center of circular slide frame 400.

The exploded view illustrates an embodiment having a focus adjustment mechanism that allows movement of magnifying lens 340. Lens slide 362 can move forwards and backwards within aperture 310. Lens attachment 364 clips onto lens slide 362 to hold magnifying lens 340 in a press fit between lens attachment 364 and lens slide 362.

The embodiment in FIGS. 3A and 3B relies on the camera of mobile device 100 to provide some slide decoding functionality. Body 302 is designed to cover the camera module of mobile device 100 and includes a camera opening 380 and light channel 382 in the rear surface of body 302. The slide frame receiving slot 330 is open to camera opening 380 to allow a slide encoding block 410 (see FIG. 4) of slide frame 400 to be captured by the camera of mobile device 100. Light from camera flash 102 is transmitted via light channel 382 into camera opening 380 to allow camera of mobile device 100 to capture slide encoding block 410 associated with the currently illuminated slide transparency 402. Light channel 382 can be free space or any light transmissive material (e.g. clear plastic or glass).

Referring now to FIG. 4, shown is a front view of a circular-shaped slide frame 400 designed to work with the image projection device 300 illustrated in FIGS. 3A and 3B. Slide frame 400 includes slide encoding information in an encoding block 410 adjacent corresponding slide transparencies 402. Encoding information in encoding block 410 can identify slide transparency 402 that is being projected to mobile device 100 to allow mobile device 100 to coordinate with the projected image (e.g. playing associated media such as audio, e.g. song, audio dialogue, sound effects, etc., video on mobile device video display e.g. book text, movie clips).

Slide frame 400 can include notches or depressions 404 that mate with corresponding structure within slide frame receiving slot 330. For example, slide frame receiving slot 330 can have a flexible detent within the slot that mates with notch/depression 404 on the slide frame 404 to align the slide frame within the aperture 310. The flexible detent can be flexible plastic or spring based. Other embodiments can have a rigid detent and the slide frame can be comprised of a flexible material to allow movement and alignment of slide transparency 402 within aperture 310. Some embodiments of slide frame 400 can include a notch with a moderate slope on one edge and a much steeper slope on the other edge that engages with a pawl or detent within slide frame receiving slot to restrict movement of slide frame 400 in a single direction (e.g. using a ratchet/pawl mechanism).

Encoding information that is encoded within encoding block 410 can identify slide transparency 402 that is currently being projected. Many different encoding methods of encoding information into encoding block 410 can be used. For example, in FIG. 4, encoding block 410 is a color transparency that can be detected by the camera of mobile device 100 when used in the embodiment of image projection device 300. Light from camera flash 102 can pass through light channel 382 to illuminate the color transparency encoding block 410 and the color can be determined by mobile device 100 through its camera. Each slide transparency 402 on slide frame 400 can have a unique color associated with it.

Figure 5:
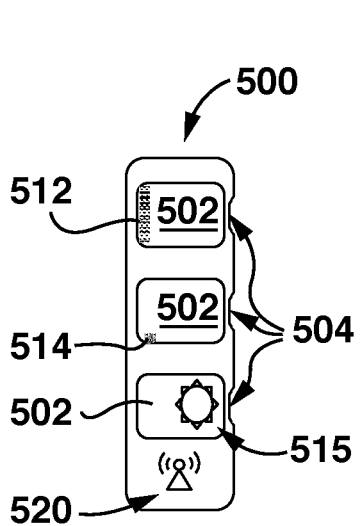
FIG. 5 is a front view of a rectangular-shaped slide frame including slide encoding information embedded in the slide transparency.

Referring now to FIG. 5, shown is an embodiment of a rectangular slide frame 500 that includes an encoding information in an encoding block that is within each slide transparency 502 itself (i.e. rather than in an encoding block separate 410 separate from slide transparencies 402 as in FIG. 4). FIG. 5 illustrates a number of different encoding methodologies, but preferably only a single type of encoding is used for a slide frame. In the first two example slide transparencies, the encoding block encodes information using a barcode embedded in slide transparency 502 that can be detected by a camera of mobile device 100 when slide transparency 502 is projected onto a projection surface. The encoding block can include a barcode of any type (including linear barcodes, 2-D barcodes such as QR codes, or barcodes that include color). For example, a linear barcode 512 and a QR code 514 are shown embedded in the slide transparencies 502 of FIG. 5. Slide frame 500 includes depressions 504 that can engage a detent or pin in a slide frame receiving slot to aid in aligning slide frame 500 within aperture of image projection device.

In some embodiments, the encoding information can include the slide transparency image itself, such that mobile device 100 can use image processing to identify the projected image from a number of possible slide transparencies. In these embodiments, encoding block can also be considered to be the slide transparency 502 itself. For example, mobile device 100 can process the projected image obtained by the camera to obtain a signature for the projected image, and then compare this signature to signatures from a database, either on mobile device 100 or on a network connected server, to identify the particular slide transparency. A cartoon sun 515, provided as an example, can result in a unique signature to assist in identifying the particular slide transparency to mobile device 100. For example, an edge detection algorithm can be used to identify the projected slide on the projection surface, and then a further edge detection algorithm can be used on the identified projected slide to obtain an edge detection matrix that can be compared with the edge matrices of known slide transparencies.

Encoding information in an encoding block can be unique to all possible slide transparencies (i.e. a globally unique identifier) or only unique to the slide transparencies on a given slide frame (e.g. identifies the slide numbers 1 through 10). Depending on the encoding methodology used, it may be difficult to have globally unique identifiers for each slide transparency. For example, if the color encoding methodology is used, such as in FIG. 4, it may only be possible to accurately encode a fixed number of colors that can be detected due to the distance of the encoding block to the camera, amount of light, and variability between mobile device cameras from various manufacturers. In these embodiments without globally unique encoding information in encoding block 410, slide frame 400 can include a slide frame encoding block 420 that uniquely identifies slide frame 400 so that a particular slide transparency 402 can be uniquely identified by the combination of encoding block 410 and slide frame encoding block 420. Slide frame identifier 420 can include written text on slide frame 400 (requiring user to identify slide frame to mobile device 100 through an input device) or can also include a near-field communication (NFC) tag that is detected by an NFC sensor of the mobile device 100, for example.

Figure 6:
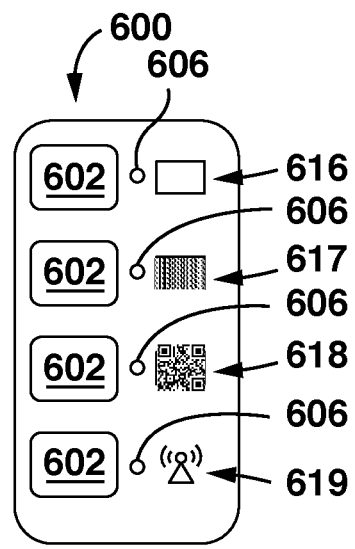
FIG. 6 is a front view of a rectangular-shaped slide frame including slide encoding information in an adjacent encoding block.

Referring now to FIG. 6, shown is a rectangular slide frame 600 with encoding blocks adjacent to each slide transparency 602. Again, multiple encoding methodologies are shown on slide frame 600 for illustration purposes. Slide frame 600 is designed such that the encoding block is positioned near the slide decoder of mobile device 100, such as the mobile device camera or NFC transceiver. Directly focusing on the encoding block (rather than the projected encoding block in FIG. 5) can limit the resolution (or amount of information encoded) that can be reliably detected by the mobile device camera. Mobile device 100 can configure the camera to focus on the closely positioned encoding block. Slide frame 600 also includes a number of protrusions 606 that can mate with a corresponding depression within slide frame receiving slot to assist in the alignment of slide frame 600 within the aperture of image projection device. Examples shown in FIG. 6 include encoding information with color using a color transparency 616, encoding information in a barcode, such as a linear barcode 617 and a QR code 618, and encoding information in an NFC tag 619.

Figure 7:
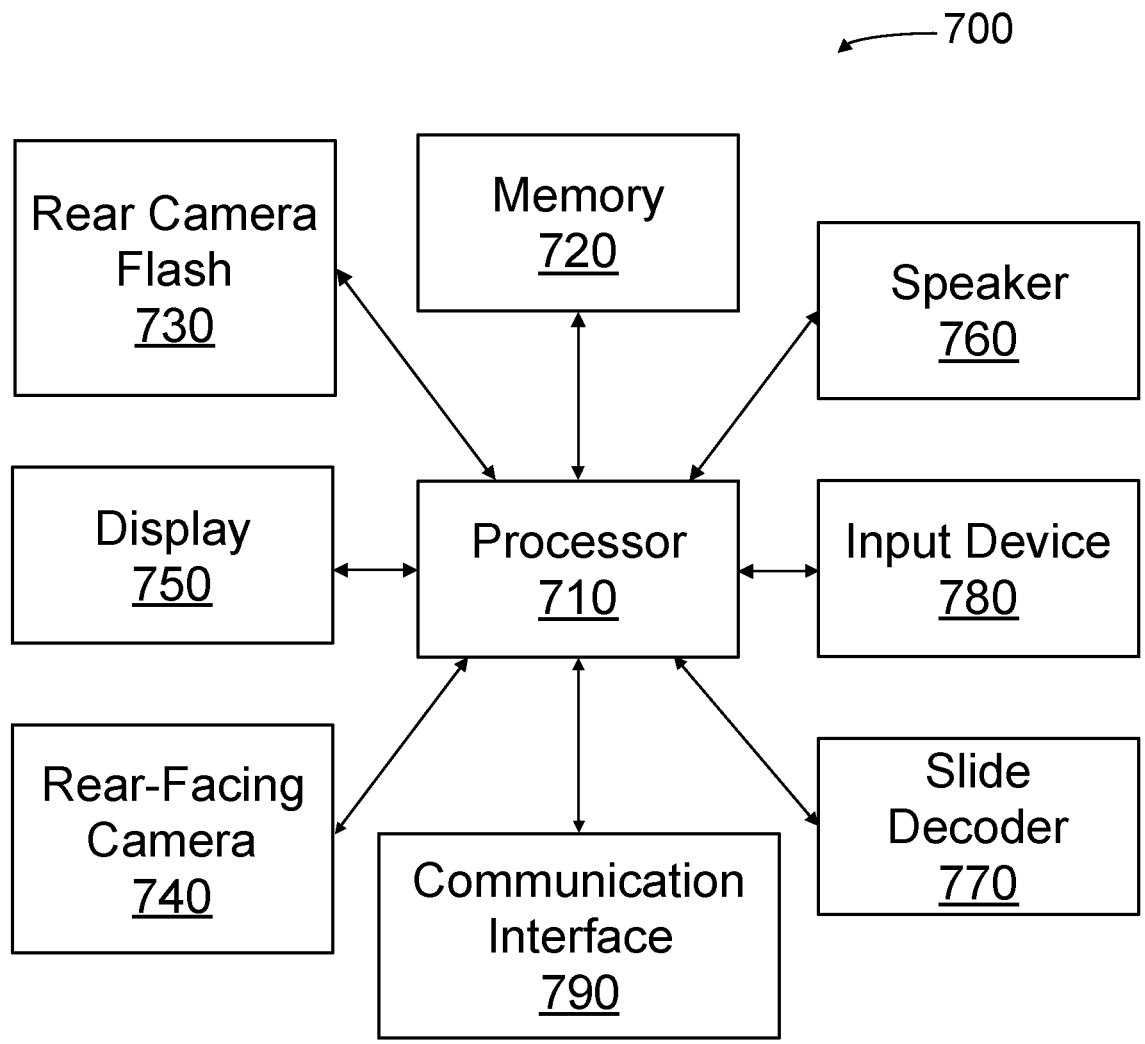
FIG. 7 is a block diagram of a mobile device having a rear-facing camera and associated rear camera flash.

Reference is next made to FIG. 7, shown is a block diagram of a mobile device 700 that can include a processor 710, a memory 720, a rear camera flash 730, a rear-facing camera 740, a display 750, a speaker 760, a slide decoder 770, and an input device 780. A communication interface 790 can be provided to allow mobile device 700 to communicate with other computing devices (including computerized embodiments of image projection device, for example) either wired or wirelessly, or over a communication network. As noted above, communication interface 790 can include the charging port of mobile device 700, Wi-Fi, or Bluetooth. Mobile device 700 can execute programs stored in memory 720 using processor 710 to interact (receive input and output) from the other components illustrated in FIG. 7. Rear camera flash 730 and rear-facing camera 740 can be positioned on the rear surface of mobile device 700, such as that shown in FIG. 1. Mobile device 700 can control rear camera flash 730 to operate as a projection light source for the image projection device 200 shown in FIG. 2. Examples of mobile device 700 can include mobile computing devices, such as mobile phones, laptop computers or tablet computing devices.

Mobile device 700 can provide audio and video through speaker 760 and display 750. Users can interact and provide input to mobile device 700 through input device 780, which can include a keyboard, buttons, or a touch screen interface. Input received through input device 780 can be used to initiate sending instructions to a coupled image projection device (e.g. advance to next slide, adjust focus, etc.).

Slide decoder 770 can decode the encoding information in an encoding block (such as encoding block 410 or slide frame encoding block 420) on a slide frame to assist in identifying a particular slide transparency. Slide decoder 770 can include rear-facing camera 740. Slide decoder 770 can also be a wireless receiver, such as a near-field communication transceiver.

Figure 8:
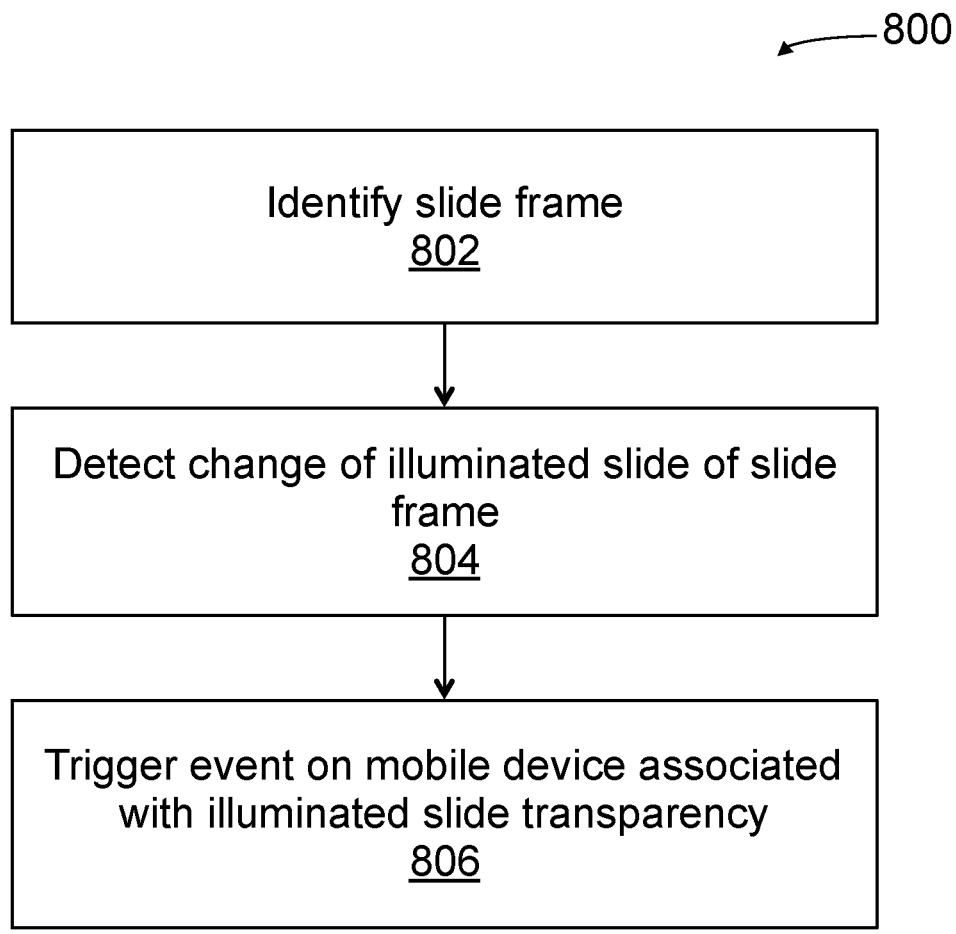
FIG. 8 is a flowchart diagram of a method of triggering an event on a mobile device based upon a change in the illuminated slide.

Referring now to FIG. 8, shown is a flowchart diagram of a method 800 of triggering an event on a mobile device based upon a change in the illuminated slide in image projection device 200. Method 800 can be used to coordinate the playback of multimedia that corresponds to the slide transparency that is currently being projected. First at step 802, the slide frame is identified. This step can utilize slide decoder 770 of mobile device 700 to decode a slide frame encoding block, such as slide frame encoding block 420. In other embodiments, this step can include the user of mobile device 700 providing an input through input device 780 to identify the slide frame, for example, by selecting a certain application associated with the slide frame or selecting a certain story within an application that is associated with the slide frame. In other embodiments, identifying the slide frame can also include slide decoder 770 decoding the encoding block associated with anyone of the slide transparencies.

Next, at step 804, a change of the slide transparency that is illuminated or projected is detected. This can include detecting a change in the encoding block associated with a slide transparency that is detected by slide decoder 770. This step can also include mobile device 700 receiving an instruction to advance the next slide from input device 780 or a communication from image projection device 200 through communication interface 790 that the slide frame has been advanced. Image projection device 200 can also include a switch within slide frame receiving slot 230 that is triggered each time the slide frame is advanced, and this switch information can be communicated to mobile device 100 in order to detect the change in step 804.

At step 806, an event on mobile device 100 is triggered that is associated with the currently illuminated slide transparency. The event on mobile device 100 can relate to the playback of audio through speaker 760 or updating display 750. The event can also be related to operation of rear camera flash 730, such as, toggling it off and on to simulate lightning, for example.

An example of the operation of image projection device 200 and method 800 can include usage for a children's story or song. A Slide frame can contain a series of image transparencies that are associated with the children's story or song, and the mobile device runs a companion application that assists with the story telling (e.g. audio such as music and story narrative, story text displayed on mobile device display). The companion application activates the camera flash of the mobile device to illuminate the slide transparencies and receives information to identify the slide transparency and/or slide frame through a slide detection module (e.g. using camera or NFC sensor). Mobile device detects the change in the encoding information when the slide is advanced and triggers an event in the companion application executing on the mobile device (e.g. turning book page, starting audio book audio associated with the book page, playback of sound effects or story narrative).

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computers may be a server class computer having multiple processors and at least one network interface card. Program code may operate on input data to perform the functions described herein and generate output data.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A slide frame in combination with an image projection device that is removably mountable to a smartphone or tablet computing device having a camera and a camera flash: wherein the image projection device includes a body defining an aperture, the body having an attachment mechanism to removably mount the body to the smartphone or tablet computing device with the aperture positioned to receive light from the camera flash; a slide frame receiving slot within the body, the slide frame receiving slot is positioned to receive a slide frame in such a way that any one of a plurality of slide transparencies on the slide frame is positioned in the aperture such that illumination of the camera flash transmits light along the aperture and through said any one of a plurality of slide transparencies; wherein the body further includes a camera opening and a light channel that connects the camera opening with the aperture, wherein the camera opening is alignable with the camera when the aperture is aligned with the camera flash; a magnifying lens positioned distally relative to the slide frame receiving slot to receive light from after having passed through said any one of a plurality of slide transparencies, and to project said light from after having passed through said any one of a plurality of slide transparencies; wherein the slide frame includes encoded information associated with each of at least some of the plurality of slide transparencies, wherein, during use when the slide frame is installed in the image projection device with said any one of a plurality of slide transparencies in alignment with the aperture, the encoded information that is associated with any one of a plurality of slide transparencies is capturable by the camera through the camera opening and is readable by an application on the smartphone or tablet computing device to instruct the smartphone or tablet computing device to emit at least one form of output selected from the group of output consisting of: audio output and visual output, wherein the at least one form of output is selected based on detection by the application of a change in the encoded information based on which slide transparency from the at least some of the plurality of slide transparencies is aligned with the camera flash.

2. The slide frame of claim 1, further comprising at least one encoding block adjacent to the at least one slide transparency, the encoding block having the encoded information.

3. The slide frame of claim 2, wherein the at least one encoding block is any one of a barcode, a color, and a near-field wireless communication tag.

4. The slide frame of claim 1, wherein the encoded information is encoded in an image of the at least one slide transparency.

5. The slide frame of claim 4, wherein the encoded information is encoded as a barcode.

\* \* \* \* \*